(12) United States Patent
Wilenski et al.

(10) Patent No.: US 10,457,033 B2
(45) Date of Patent: Oct. 29, 2019

(54) SYSTEMS AND METHODS FOR ADDITIVELY MANUFACTURING COMPOSITE PARTS

(71) Applicant: The Boeing Company, Chicago, IL (US)

(72) Inventors: Mark Stewart Wilenski, Mercer Island, WA (US); Michael Patrick Kozar, Mercer Island, WA (US); Nick Shadbeh Evans, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 248 days.

(21) Appl. No.: 15/345,189

(22) Filed: Nov. 7, 2016

(65) Prior Publication Data

US 2018/0126667 A1  May 10, 2018

(51) Int. Cl.
*B33Y 30/00* (2015.01)
*B33Y 70/00* (2015.01)
(Continued)

(52) U.S. Cl.
CPC .............. *B33Y 10/00* (2014.12); *B29C 31/04* (2013.01); *B29C 64/106* (2017.08);
(Continued)

(58) Field of Classification Search
CPC ......... B33Y 30/00; B33Y 10/00; B33Y 70/00; B29C 64/20; B29C 64/165; B29C 64/141;
(Continued)

(56) References Cited

U.S. PATENT DOCUMENTS 3,600,272 A  8/1971  Cortigene et al.
3,813,976 A  6/1974  Greer
(Continued)

FOREIGN PATENT DOCUMENTS

CN  103817937  5/2014
DE  201310103973  10/2014
(Continued)

OTHER PUBLICATIONS

U.S. Appl. No. 14/841,423, filed Aug. 31, 2015, Evans et al.
(Continued)

*Primary Examiner* — Anthony Calandra
*Assistant Examiner* — Caroline Montiel
(74) *Attorney, Agent, or Firm* — DASCENZO Intellectual Property Law, P.C.

(57) ABSTRACT

Systems and methods for additively manufacturing composite parts are disclosed. Systems comprise at least a feedstock source and a feed mechanism. The feedstock source comprises a plurality of pre-consolidated tows, with each pre-consolidated tow comprising a fiber tow within a non-liquid binding matrix. In some systems, a tow combiner receives at least a subset of the plurality of pre-consolidated tows from the feedstock source and combines the subset of the plurality of pre-consolidated tows to define a macro tow. The feed mechanism moves the subset of the plurality of pre-consolidated tows from the feedstock source and into the tow combiner and moves the macro tow from the tow combiner. Methods according to the present disclosure comprise combining a plurality of pre-consolidated tows to define a macro tow, and dispensing the macro tow in three dimensions to define a composite part.

21 Claims, 4 Drawing Sheets

(51) Int. Cl.
  *B29C 31/04* (2006.01)
  *B29C 64/336* (2017.01)
  *B29C 64/165* (2017.01)
  *B29C 64/20* (2017.01)
  *B29K 105/08* (2006.01)
  *B33Y 10/00* (2015.01)
  *B29C 70/38* (2006.01)
  *B29C 64/106* (2017.01)

(52) U.S. Cl.
  CPC ............ *B29C 64/165* (2017.08); *B29C 64/20* (2017.08); *B29C 64/336* (2017.08); *B29C 70/38* (2013.01); *B33Y 30/00* (2014.12); *B33Y 70/00* (2014.12); *B29K 2105/08* (2013.01)

(58) Field of Classification Search
  CPC ... B29C 64/106; B29C 70/382; B29C 70/384; B29C 70/08; B29C 70/081; B29C 70/24; B29C 64/336; B29C 70/38; B29C 31/04; B29K 2105/08
  See application file for complete search history.

(56) References Cited

U.S. PATENT DOCUMENTS

| | | | |
|---|---|---|---|
| 3,873,399 A * | 3/1975 | Goldsworthy | B29C 70/525 156/180 |
| 3,993,726 A * | 11/1976 | Moyer | B29B 15/122 264/171.12 |
| 4,154,634 A | 5/1979 | Shobert et al. | |
| 4,378,343 A | 3/1983 | Sugiura et al. | |
| 4,435,246 A | 3/1984 | Green | |
| 4,799,985 A * | 1/1989 | McMahon | D02G 3/402 156/166 |
| 4,943,472 A | 7/1990 | Dyksterhouse et al. | |
| 4,973,503 A * | 11/1990 | Hotchkiss | B29D 23/001 138/137 |
| 5,204,124 A | 4/1993 | Secretan et al. | |
| 5,294,461 A | 3/1994 | Ishida | |
| 5,340,433 A | 8/1994 | Crump | |
| 5,398,193 A | 3/1995 | deAngelis | |
| 5,495,328 A | 2/1996 | Spence et al. | |
| 5,914,080 A * | 6/1999 | Gauchel | B29C 31/085 264/103 |
| 5,936,861 A | 8/1999 | Jang et al. | |
| 6,129,872 A | 10/2000 | Jang | |
| 6,149,856 A | 11/2000 | Zemel et al. | |
| 6,214,279 B1 | 4/2001 | Yang et al. | |
| 6,395,210 B1 | 5/2002 | Head et al. | |
| 6,500,370 B1 * | 12/2002 | Belvin | B29C 70/16 156/180 |
| 6,722,872 B1 | 4/2004 | Swanson et al. | |
| 7,114,943 B1 | 10/2006 | Fong et al. | |
| 8,133,537 B2 | 3/2012 | Nair et al. | |
| 8,801,990 B2 | 8/2014 | Mikulak et al. | |
| 8,920,697 B2 | 12/2014 | Mikulak et al. | |
| 9,149,989 B2 | 10/2015 | Uckelmann | |
| 2003/0044593 A1 | 3/2003 | Vaidyanathan et al. | |
| 2004/0119188 A1 * | 6/2004 | Lowe | B29C 70/50 264/131 |
| 2005/0023719 A1 | 2/2005 | Nielsen et al. | |
| 2005/0038222 A1 | 2/2005 | Joshi et al. | |
| 2005/0104241 A1 | 5/2005 | Kritchman et al. | |
| 2005/0116391 A1 | 6/2005 | Lindemann et al. | |
| 2005/0248065 A1 | 11/2005 | Owada | |
| 2007/0029030 A1 | 2/2007 | McCowin | |
| 2008/0213419 A1 | 9/2008 | Skubic et al. | |
| 2008/0315462 A1 | 12/2008 | Batzinger et al. | |
| 2009/0095410 A1 | 4/2009 | Oldani | |
| 2009/0130449 A1 | 5/2009 | El-Siblani | |
| 2009/0314391 A1 | 12/2009 | Crump et al. | |
| 2010/0024964 A1 | 2/2010 | Ingram, Jr. et al. | |
| 2010/0084087 A1 | 4/2010 | McCowin et al. | |
| 2010/0190005 A1 | 7/2010 | Nair et al. | |
| 2011/0147993 A1 | 6/2011 | Eshed et al. | |
| 2011/0300301 A1 | 12/2011 | Fernando et al. | |
| 2013/0136890 A1 * | 5/2013 | Maliszewski | B29C 48/05 428/113 |
| 2014/0061974 A1 | 3/2014 | Tyler | |
| 2014/0086780 A1 | 3/2014 | Miller et al. | |
| 2014/0154347 A1 | 6/2014 | Dilworth et al. | |
| 2014/0263534 A1 | 9/2014 | Post et al. | |
| 2014/0265000 A1 | 9/2014 | Magnotta et al. | |
| 2014/0265040 A1 | 9/2014 | Batchelder | |
| 2014/0291886 A1 * | 10/2014 | Mark | B29C 64/118 264/163 |
| 2014/0328964 A1 | 11/2014 | Mark et al. | |
| 2014/0375794 A1 | 12/2014 | Singh | |
| 2015/0008422 A1 | 1/2015 | Lee et al. | |
| 2015/0037599 A1 | 2/2015 | Blackmore | |
| 2015/0044377 A1 | 2/2015 | Tibor et al. | |
| 2015/0048553 A1 | 2/2015 | Dietrich et al. | |
| 2015/0140230 A1 | 5/2015 | Jones et al. | |
| 2015/0165691 A1 | 6/2015 | Mark et al. | |
| 2015/0174824 A1 | 6/2015 | Gifford et al. | |
| 2015/0217517 A1 | 8/2015 | Karpas et al. | |
| 2015/0266243 A1 | 9/2015 | Mark et al. | |
| 2015/0291833 A1 | 10/2015 | Kunc et al. | |
| 2016/0136897 A1 | 5/2016 | Nielsen-Cole et al. | |
| 2016/0159009 A1 | 6/2016 | Canale | |
| 2016/0303793 A1 | 10/2016 | Ermoshkin et al. | |
| 2016/0332363 A1 | 11/2016 | Moore et al. | |
| 2016/0375491 A1 | 12/2016 | Swaminathan et al. | |
| 2017/0014906 A1 | 1/2017 | Ng et al. | |
| 2017/0129180 A1 | 5/2017 | Coates et al. | |
| 2017/0341307 A1 | 11/2017 | Vilajosana et al. | |

FOREIGN PATENT DOCUMENTS

| | | |
|---|---|---|
| DE | 102015002967 | 10/2016 |
| EP | 1151849 | 11/2001 |
| JP | 2015174284 | 10/2015 |
| WO | WO 2006/020685 | 2/2006 |
| WO | WO 2012/039956 | 3/2012 |
| WO | WO 2013/086577 | 6/2013 |
| WO | WO 2014/153535 | 9/2014 |
| WO | WO 2015/009938 | 1/2015 |
| WO | WO2015193819 | 12/2015 |
| WO | WO 2016/053681 | 4/2016 |
| WO | WO 2016053681 | 4/2016 |
| WO | WO 2016125138 | 8/2016 |
| WO | WO 2016139059 | 9/2016 |
| WO | WO2016149181 | 9/2016 |

OTHER PUBLICATIONS

Ogale et al., "Fabrication of Fiber Reinforced Plates with Curvilinear Layout by 3-D Photolithography," 26th International SAMPE Technical Conference, vol. 26, pp. 54-61, Oct. 17-20, 1994.

Ogale et al., "3-Dimensional Composite Photolithography," Proceedings of the American Society for Composites, Eleventh Technical Conference, pp. 822-828, Oct. 7-9, 1996.

Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.

Gupta et al., "Dual Curing of Carbon Fiber Reinforced Photoresins for Rapid Prototyping," Polymer Composites, vol. 23, No. 6, pp. 1162-1170, Dec. 2002.

Hu et al., "Sensing, Modeling and Control for Laser-Based Additive Manufacturing," International Journal of Machine Tools and Manufacture, No. 43, pp. 51-60, 2003.

U.S. Appl. No. 14/841,470, filed Aug. 31, 2015, Evans et al.

U.S. Appl. No. 14/920,748, filed Oct. 22, 2015, Evans et al.

Farshidianfar et al., "Real-Time Control of Microstructure in Laser Additive Manufacturing," International Journal of Advanced Manufacturing Technology (2016), vol. 82, pp. 1173-1186, published online Jul. 1, 2015.

Website screenshots showing "Fiber Composite 3D Printing," from MakeZine.com website, downloaded on Jun. 2, 2015.

(56) References Cited

OTHER PUBLICATIONS

User Manual for 3Doodler 2.0, from The3Doodler.com website, downloaded on Aug. 19, 2015.
Printout of website article, "Automated Fiber Placement," from AutomatedDynamics.com website, downloaded on Aug. 19, 2015.
Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, from ScienceDirect.com website, downloaded on Aug. 19, 2015.
Website screenshots showing the Mark One Composite 3D Printer, from MarkForged.com website, downloaded on Aug. 19, 2015.
U.S. Appl. No. 14/931,573, filed Nov. 3, 2015, Evans et al.
U.S. Appl. No. 14/995,507, filed Jan. 14, 2016, Evans et al.
U.S. Appl. No. 15/063,400, filed Mar. 7, 2016, Evans et al.
Printout of online article, "Carbon-Fiber Epoxy Honeycombs Mimic the Material Performance of Balsa Wood," Jun. 27, 2014, from RedOrbit.com website, downloaded on Aug. 19, 2015.
Website screenshots showing online article, Krassenstein "Orbital Composites to Make 3D Printing 100 Times Faster Using Carbon Fiber, Fiber Optics, Injection & More," Apr. 28, 2015, from 3DPrint.com website, downloaded on Aug. 19, 2015.
Printout of online article, "Carbon3D Introduces Breakthrough CLIP Technology for Layerless 3D Printing, 25-100x Faster," Mar. 17, 2015, from 3Ders.org website, downloaded on Aug. 19, 2015.
Website screenshots showing the Form 1+ SLA 3D Printer, from FormLabs.com website, downloaded on Aug. 20, 2015.
Website printout showing FormLabs, Frequently Asked Questions (re the Form1+ SLA 3D Printer), from FormLabs.com website, downloaded on Aug. 19, 2015.
Website screenshots of online how-to article, "Fiber Composite 3D Printing (The Bug)," from Instructables.com website, downloaded on Aug. 20, 2015.
Website screenshots of online article, Evan Milberg, "Arevo Labs Introduces First Robot-Based Platform for 3-D Printing Composite Parts," Nov. 23, 2015, from CompositesManufacturingMagazine.com website, downloaded on Jan. 12, 2016.
Printout of online article, Jeff Sloan, "Arevo Labs launches 3D printing platform for composite parts fabrication," Nov. 16, 2015, from CompositesWorld.com website, downloaded on Dec. 9, 2015.
Printout of online article, "Improving Additive Manufacturing (3D-Printing) using Infrared-Imaging," Aug. 10, 2016, from AZoM.com website, downloaded on Nov. 4, 2016.
Website screenshots showing Stratonics ThermaViz® Sensor Systems, from Stratonics.com website, downloaded on Nov. 4, 2016.
Farshidianfar et al., "Real-Time Control of Microstructure in Laser Assitive Manufacturing," International Journal of Advanced Manufacturing Technology (2016), vol. 82, pp. 1173-1186, published online Jul. 1, 2015.
Machine generated English translation of CN 103817937, dated Mar. 26, 2018.
Machine generated English translation of the abstract of JP2015174284, downloaded from Espacenet.com Jun. 12, 2018.
Machine generated English translation of the abstract of DE102015002967, downloaded from Espacenet.com Jun. 12, 2018.
European Patent Office, Extended European Search Report for related European Application No. 17195735, dated Mar. 23, 2018.
Machine generated English translation of abstract for DE 201310103973 downloaded from Espacenet.com on Nov. 1, 2017.

* cited by examiner

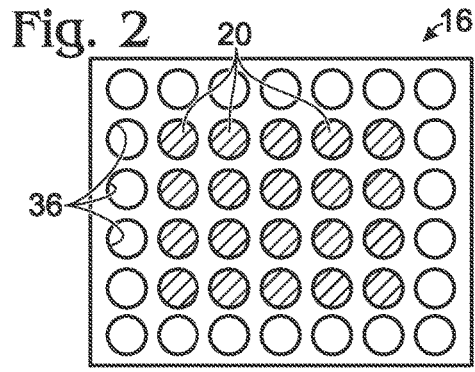
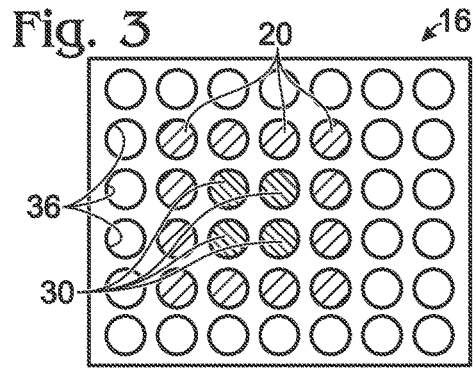
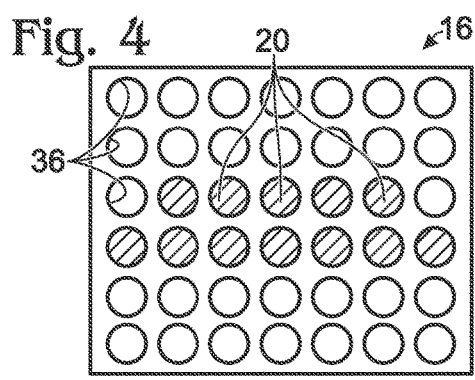
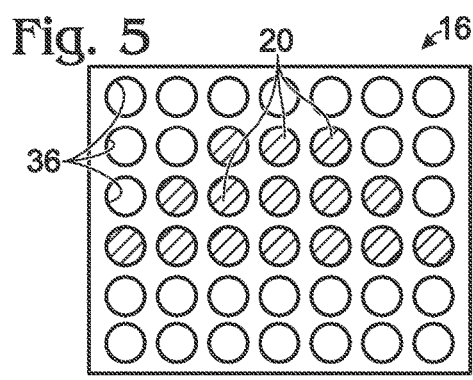
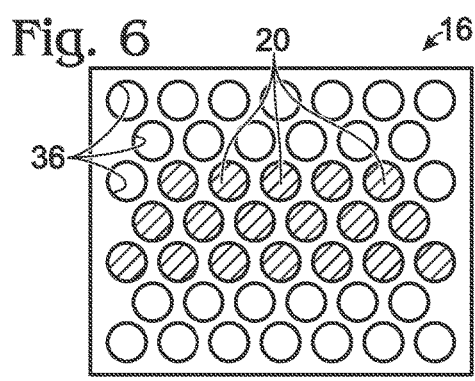
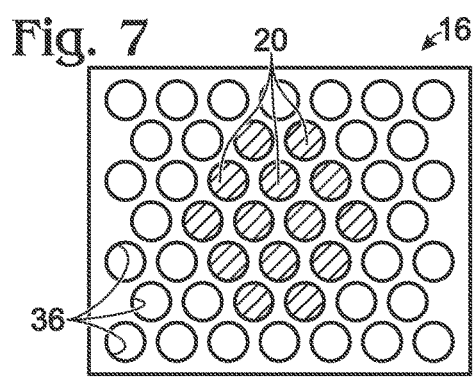
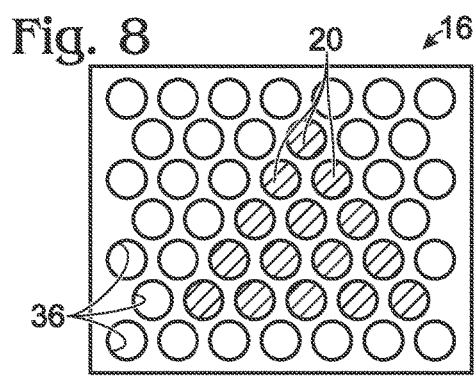
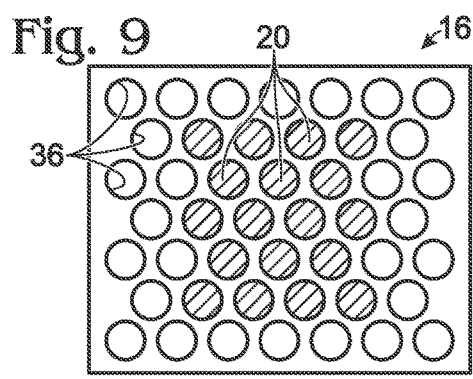

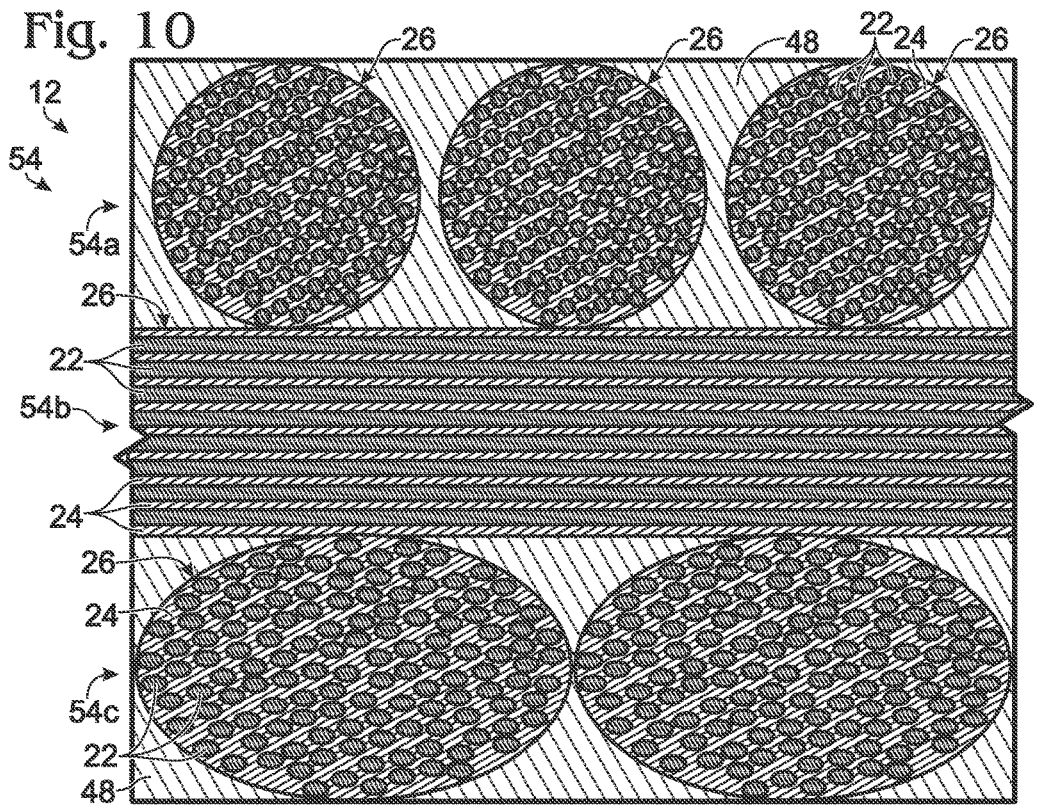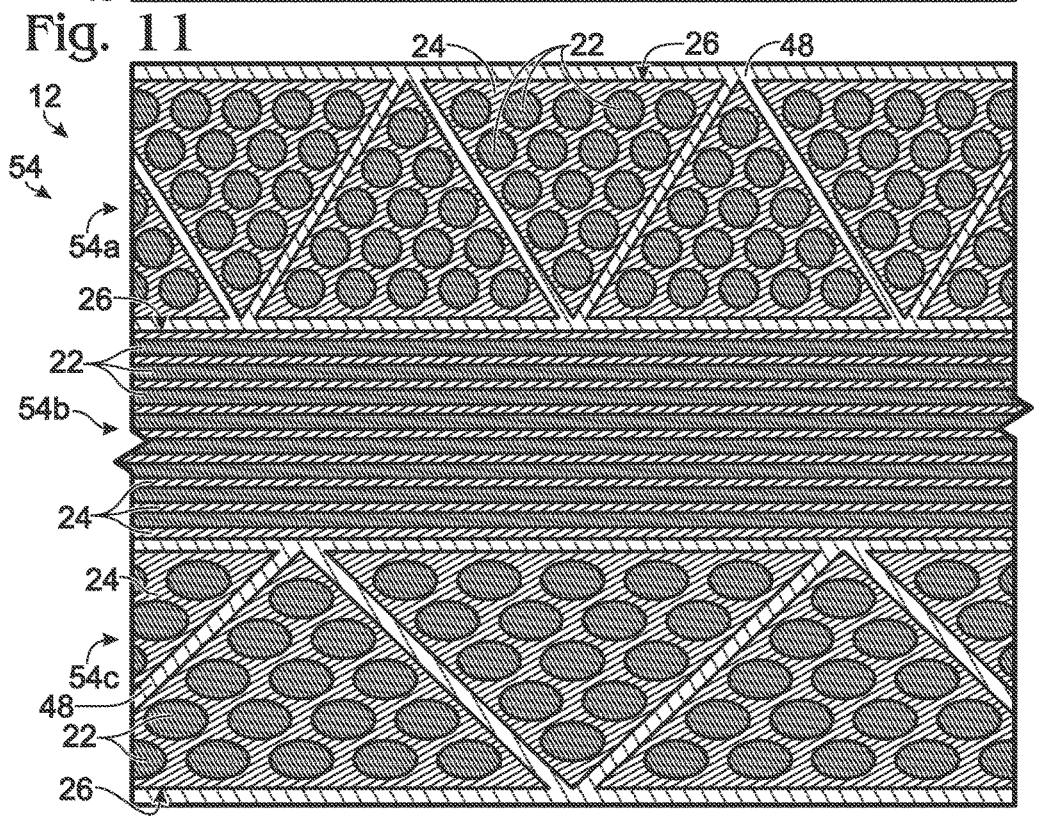

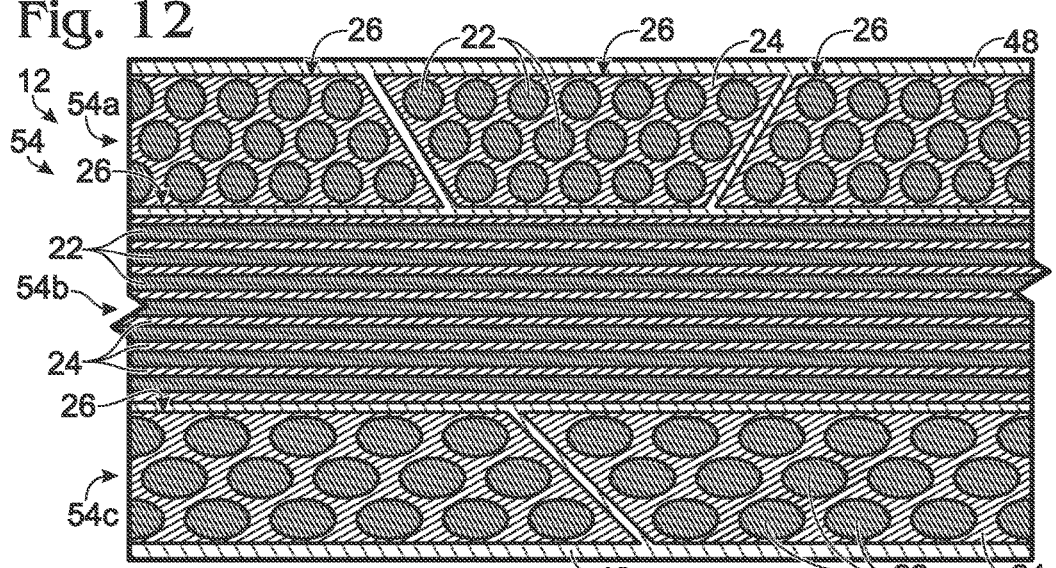
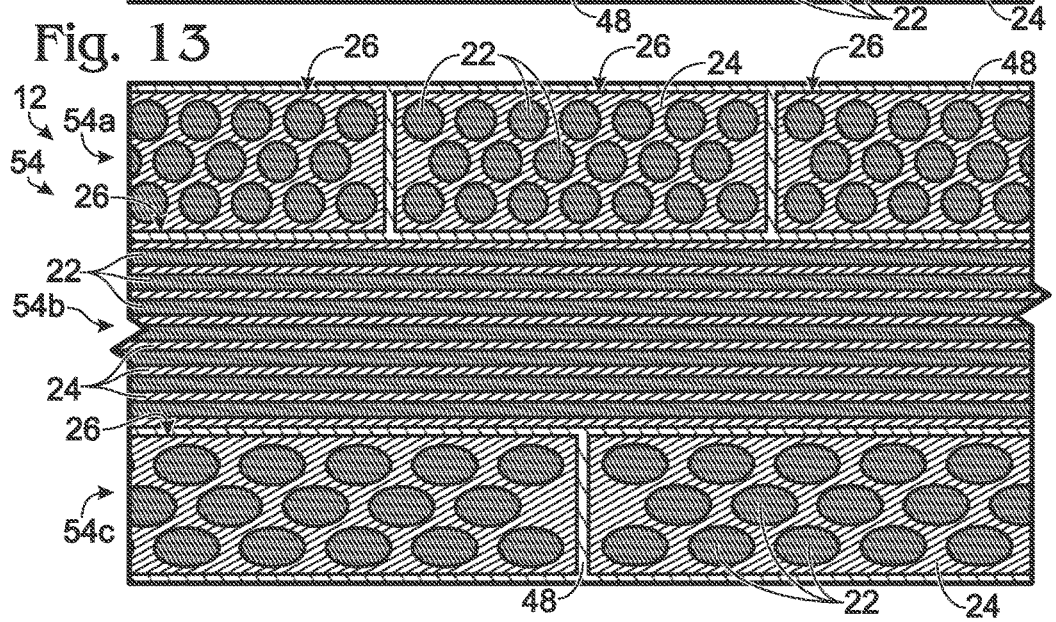
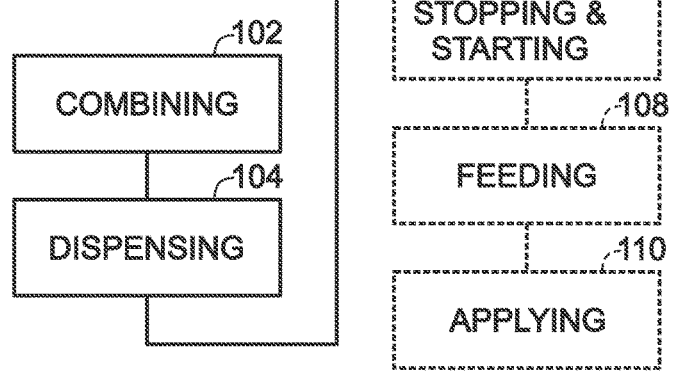

SYSTEMS AND METHODS FOR ADDITIVELY MANUFACTURING COMPOSITE PARTS

FIELD

The present disclosure relates to additive manufacturing of composite parts

BACKGROUND

Conventionally, manufacturing of typical composite parts relies on sequential layering of multiple plies of composite material, with each ply containing, e.g., unidirectional reinforcement fibers, fabrics, or randomly oriented chopped fibers. Parts manufactured in this manner must have laminar construction, which undesirably increases the weight of the finished part, since not all of the reinforcement fibers are oriented along the direction(s) of the force(s) to be applied to the parts. Additionally, limitations inherent to laminar techniques of manufacturing composites are not conducive to implementation of many types of advanced structural designs.

SUMMARY

Systems and methods for additively manufacturing composite parts are disclosed. Systems according to the present disclosure comprise at least a feedstock source and a feed mechanism. The feedstock source comprises a plurality of pre-consolidated tows, with each pre-consolidated tow comprising a fiber tow within a non-liquid binding matrix. Some systems further comprise a tow combiner that is positioned to receive at least a subset of the plurality of pre-consolidated tows from the feedstock source. The tow combiner is configured to combine the subset of the plurality of pre-consolidated tows to define a macro tow. The feed mechanism is configured to move the subset of the plurality of pre-consolidated tows from the feedstock source and into the tow combiner and to move the macro tow from the tow combiner. Some methods according to the present disclosure comprise combining a plurality of pre-consolidated tows to define a macro tow, and dispensing the macro tow in three dimensions to define a composite part. Some methods according to the present disclosure comprise applying an adhesive to a pre-consolidated tow, and dispensing the pre-consolidated tow with the adhesive in three dimensions to define a composite part.

BRIEF DESCRIPTION OF THE DRAWINGS

FIG. 2 is a schematic diagram representing example tow combiners and example tow patterns of systems for additively manufacturing composite parts.

FIG. 3 is a schematic diagram representing example tow combiners and example tow patterns of systems for additively manufacturing composite parts.

FIG. 4 is a schematic diagram representing example tow combiners and example tow patterns of systems for additively manufacturing composite parts.

FIG. 5 is a schematic diagram representing example tow combiners and example tow patterns of systems for additively manufacturing composite parts.

FIG. 6 is a schematic diagram representing example tow combiners and example tow patterns of systems for additively manufacturing composite parts.

FIG. 7 is a schematic diagram representing example tow combiners and example tow patterns of systems for additively manufacturing composite parts.

FIG. 8 is a schematic diagram representing example tow combiners and example tow patterns of systems for additively manufacturing composite parts.

FIG. 9 is a schematic diagram representing example tow combiners and example tow patterns of systems for additively manufacturing composite parts.

FIG. 10 is a schematic representation of a cross-section of a portion of an example composite part manufactured by a system and/or method of the present disclosure.

FIG. 11 is a schematic representation of a cross-section of a portion of an example composite part manufactured by a system and/or method of the present disclosure.

FIG. 12 is a schematic representation of a cross-section of a portion of an example composite part manufactured by a system and/or method of the present disclosure.

FIG. 13 is a schematic representation of a cross-section of a portion of an example composite part manufactured by a system and/or method of the present disclosure.

FIG. 14 is a flowchart schematically representing example methods for additively manufacturing composite parts.

DESCRIPTION

Figure 1:
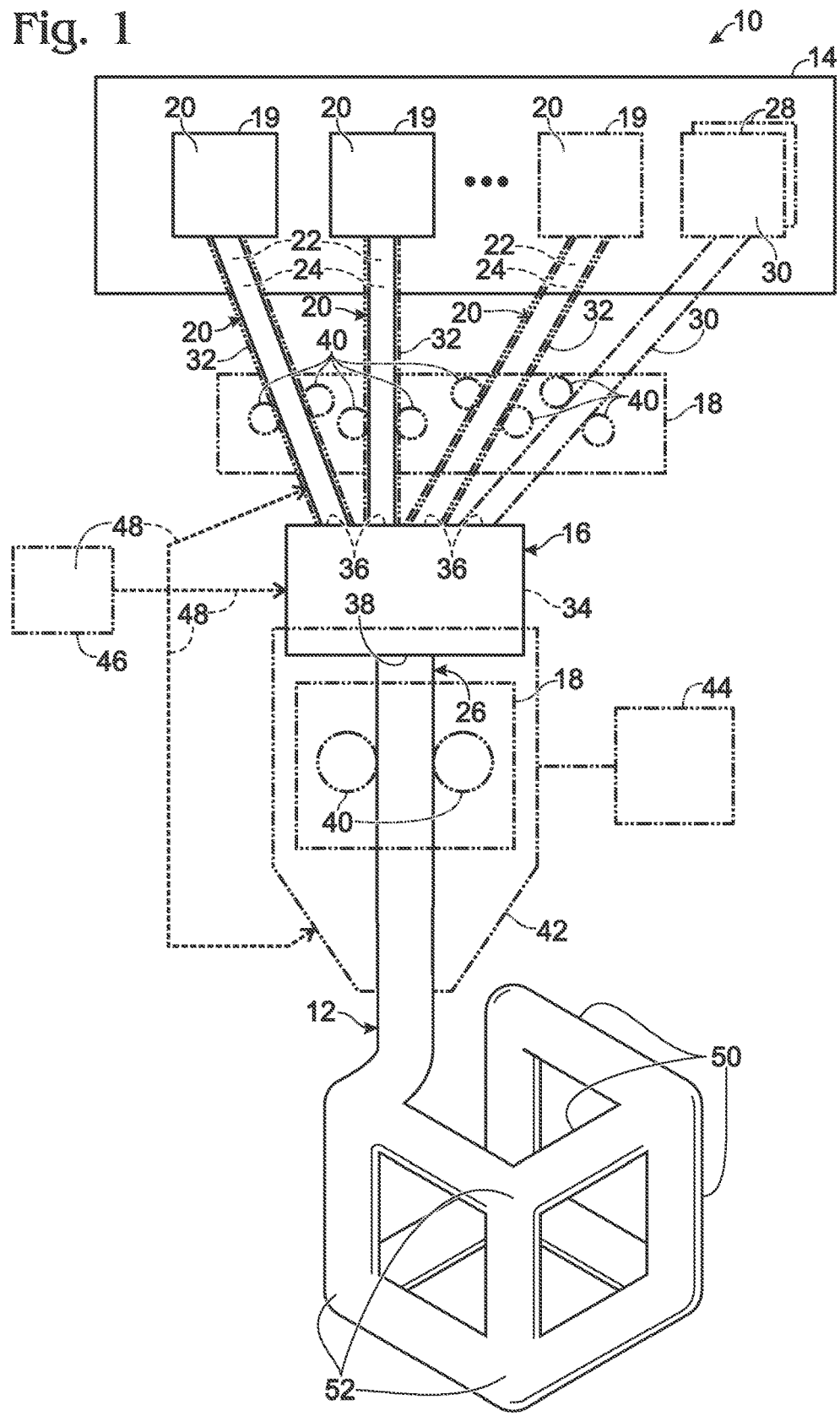
FIG. 1 is a schematic diagram representing example systems for additively manufacturing composite parts.

Systems and methods for additively manufacturing composite parts are disclosed herein. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

As schematically illustrated in FIG. 1, systems 10 for additively manufacturing a composite part 12 comprise at least a feedstock source 14 and a feed mechanism 18. Some systems 10 further comprise a tow combiner 16.

In some examples of systems 10, the feedstock source 14 comprises a plurality of supplies 19 of pre-consolidated tows 20 with each pre-consolidated tow 20 comprising a fiber tow 22 within a non-liquid binding matrix 24. The supplies 19, for example, may take the form of spools of pre-consolidated tows 20, but other configurations of supplies 19 are within the scope of the present disclosure. In some examples of systems 10, the feedstock source 14 may produce the pre-consolidated tows 20 from their constituent parts, that is, from their respective fiber tow(s) 22 and non-liquid binding matrix 24, which matrix may initially be in liquid form in the feedstock source 14. The tow combiner 16 is positioned to receive at least a subset of the plurality of pre-consolidated tows 20 from the feedstock source 14, and the tow combiner 16 is configured to combine the subset of the plurality of pre-consolidated tows 20 to define a macro tow 26, as schematically represented in FIG. 1. In other words, the feedstock source 14 comprises two or more supplies of pre-consolidated tows 20, from which at least a subset is selected to be combined together by the tow combiner 16 to define, or create, the macro tow 26. In FIG. 1, three pre-consolidated tows 20 are illustrated as being fed into the tow combiner 16 and thus as defining the subset of the plurality of pre-consolidated tows 20 from the feedstock source 14; however, such a subset may comprise any desirable number of pre-consolidated tows 20.

Moreover, in some implementations of systems 10, the pre-consolidated tows 20 that are fed to the tow combiner 16 and combined to define the macro tow 26 need not be the same. That is, different configurations of pre-consolidated tows 20 may be selected to define a macro tow 26 with predetermined characteristics based on the selection of pre-consolidated tows 20, but it also is within the scope of the present disclosure that a macro tow 26 be created from only a single configuration of pre-consolidated tows 20.

FIG. 1 schematically represents that any number of pre-consolidated tows 20 may be provided in a feedstock source 14, including two, three, more than three, or even tens, hundreds, or thousands of pre-consolidated tows 20.

The feed mechanism 18 is configured to move the subset of the plurality of pre-consolidated tows 20 from the feedstock source 14 and into the tow combiner 16 and to move the macro tow 26 from the tow combiner 16. As schematically and optionally represented in FIG. 1, the feed mechanism 18 therefore may be upstream of the tow combiner 16, that is, between the feedstock source 14 and the tow combiner 16 (or optionally as a component or subassembly of the feedstock source 14 itself), and/or it may be downstream of the tow combiner 16. For example, when the feed mechanism 18 is upstream of the tow combiner 16, the feed mechanism 18 operatively pulls pre-consolidated tows 20 from the feedstock source 14, or from upstream within the feedstock source 14, and pushes them into the tow combiner 16. When the feed mechanism 18 is downstream of the tow combiner 16, the feed mechanism operatively pulls pre-consolidated tows 20 from the feedstock source 14 and through the tow combiner 16. In some systems 10, the feed mechanism 18 may be positioned both upstream and downstream of the tow combiner 16. Additionally or alternatively, a system 10 may include two feed mechanisms 18, with one feed mechanism 18 upstream of the tow combiner 16 and with one feed mechanism 18 downstream of the tow combiner 16.

As mentioned, pre-consolidated tows 20 each include a fiber tow 22 within a non-liquid binding matrix 24. A fiber tow 22 is an elongate bundle of fibers with a length that is significantly greater than a diameter of the fiber tow 22 and significantly greater than a diameter of the pre-consolidated tow. As illustrative, non-exclusive examples, fiber tows 22 may have lengths that are at least 1000, at least 10000, at least 100000, or at least 1000000 times greater than diameters of the fiber tows 22 and the pre-consolidated tows 20. Additionally or alternatively, the fiber tows 22, and thus the pre-consolidated tows 20, may be as long as reasonable within the confines of material management of the pre-consolidated tows 20 and their constituent components. Examples of fibers that may comprise fiber tows 22 include, but are not limited to, carbon fibers, glass fibers, synthetic organic fibers, aramid fibers, natural fibers, wood fibers, boron fibers, silicon-carbide fibers, ceramic fibers, optical fibers, wires, metal wires, and conductive wires. Additionally, fiber tows 22 may be constructed as fiber bundles, fiber weaves, fiber braids, or wire bundles, as examples.

The non-liquid binding matrix 24, being non-liquid, enables a pre-consolidated tow 20 to be engaged and fed by the feed mechanism 18 and to maintain its integrity as it travels from the feedstock source 14 to the tow combiner 16 to be combined with other pre-consolidated tows 20 and ultimately to define a composite part 12 being manufactured. The non-liquid binding matrix 24 of a pre-consolidated tow 20 may take any suitable form depending on desired properties of the pre-consolidated tow 20. As illustrative, non-exclusive examples, a non-liquid binding matrix 24 may comprise one or more of a polymer, a resin, a thermoplastic, a thermoset, a photopolymer, an ultra-violet photopolymer, a visible-light photopolymer, an infrared-light photopolymer, an x-ray photopolymer, a partially cured binding matrix, and a fully cured binding matrix. As used herein, a photopolymer is a polymer that is configured to be cured in the presence of light, such as one or more of ultra-violet light, visible-light, infrared-light, and x-rays.

Depending on the chemistry of the non-liquid binding matrix 24, it may be described as being uncured, pre-cured, partially cured, or even fully cured, at least when the respective pre-consolidated tow 20 is being fed to the tow combiner 16 to be combined with other pre-consolidated tows 20. Additionally or alternatively, in some examples, a pre-consolidated tow 20 may be described as a prepreg, or pre-impregnated, tow. In some examples, the non-liquid binding matrix 24 of a pre-consolidated tow 20 is self-adherent, for example, is configured to adhere, or stick, to the non-liquid binding matrix 24 of another pre-consolidated tow 20, such that when the pre-consolidated tows 20 are combined by the tow combiner 16, they adhere, or stick, together to define the macro tow 26.

By "non-liquid," it is meant that the non-liquid binding matrix 24 is a solid and/or has a high viscosity, such as that is greater than one or more of $10^2$, $10^3$, $10^4$, $10^5$, $10^6$, $10^7$, $10^8$, $10^9$, $10^{10}$, $10^{11}$, or $10^{12}$ Pa·s. In some examples, a non-liquid binding matrix 24 may be described as a solid or as an amorphous solid. For example, a thermoset matrix may be described as a solid, while a thermoplastic matrix may be described as a high viscosity liquid but still being a non-liquid binding matrix 24 within the scope of the present disclosure.

Pre-consolidated tows 20 may have any suitable ratio of fibers to matrix. As illustrative, non-exclusive examples, the fiber tow 22 of a pre-consolidated tow 20 may amount to 20-80%, 20-70%, 20-60%, 20-50%, 20-40%, 20-30%, 30-80%, 30-70%, 30-60%, 30-40%, 30-50%, 40-80%, 40-70%, 40-60%, 40-50%, 50-80%, 50-70%, 50-60%, 60-80%, 60-70%, or 70-80% of the total volume of the pre-consolidated tow; however, percentages greater than and less than the numerated ranges also are within the scope of the present disclosure. Any suitable number of fibers within an individual fiber tow 22 may be utilized. A single fiber tow 22 may include 1-50000 or more individual fibers, with 1000, 3000, 6000, 12000, 24000, and 48000 fibers being illustrative, non-exclusive examples of numbers of fibers within a single fiber tow 22. A single fiber tow 22 may have any suitable diameter, or maximum external dimension of a cross-sectional profile, with 0.005-2 millimeters (mm) being illustrative non-exclusive examples. The greater the number of fibers within a single fiber tow 22 and the greater the diameter of a single fiber tow 22, the greater the stability of the fiber tow 22 and thus the pre-consolidated tow 20 is for resistance against buckling, kinking, or otherwise becoming deformed or damaged as it is manipulated by a system 10 and used to manufacture a composite part 12.

Pre-consolidated tows 20 may have any suitable cross-sectional profiles, such as depending on a particular application or property of a composite part 12 being manufactured, or depending on a combining configuration of the tow combiner 16, as discussed herein. As illustrative, non-exclusive examples, pre-consolidated tows 20 may have cross-sectional profiles that are circular, polygonal, triangular, a quadrilateral, a rhombus, trapezoidal, symmetrical, and/or asymmetrical. When describing such a profile of a pre-consolidated tow, the shape is not intended to be precise, such as having perfect corners or perfectly straight edges of a polygon, and therefore, such profiles additionally or alternatively may be described as being generally circular, generally polygonal, generally triangular, generally quadrilateral, generally rhombus-shaped, generally trapezoidal, generally symmetrical, and/or generally asymmetrical.

As mentioned, a macro tow 26 may be created from more than one configuration of pre-consolidated tows 20. For example, it may be desirable to utilize a first configuration of pre-consolidated tow(s) 20 with a first type of non-liquid binding matrix 24 and to utilize a second configuration of pre-consolidated tow(s) 20 with a second (and different) type of non-liquid binding matrix 24. For example, it may be desirable to build into a macro tow 26 two or more different types of cure mechanisms (e.g., thermal versus radiative), two or more different cure temperatures, two or more different mechanical properties, and/or two or more different other properties that may differ based on the type and/or content of the respective non-liquid binding matrixes 24. Additionally or alternatively it may be desirable to utilize a first configuration of a pre-consolidated tow(s) 20 with a first type of fiber tow(s) 22 and to utilize a second configuration of pre-consolidated tow(s) 20 with a second (and different) type of fiber tow(s) 22. For example, it may be desirable to build into a macro tow 26 two or more different physical or other properties based on the selection of the fiber tows 22, such as by selecting fiber tows 22 for one or more of electrical, thermal, or strength properties.

As schematically and optionally illustrated in FIG. 1, some systems 10 further comprise a plurality of pre-consolidated tow conduits 32, through which the pre-consolidated tows 20 respectively extend between the feedstock source 14 and the tow combiner 16. Such conduits 32 may be sized with inner diameters that are only very slightly larger than the outer diameters of the respective pre-consolidated tows 20. Accordingly, a conduit 32, when present, may restrict kinking, breaking, or otherwise damaging or deforming the respective pre-consolidated tow 20 and/or its fiber tow 22 or its non-liquid binding matrix 24. Such conduits 32 may be described as Bowden tubes or Bowden housings.

As schematically and optionally illustrated in FIG. 1, in some systems 10, the feedstock source 14 further comprises one or more supplies 28 of elongate structures 30. In such examples, the tow combiner 16 is positioned to receive at least a subset of the elongate structures 30 and combine them with the plurality of pre-consolidated tows 20 being combined to define the macro tow 26. In some such examples, the elongate structures 30 are free of a binding matrix, and therefore are distinguished from the pre-consolidated tows 20. That is, the elongate structures 30 are not the pre-consolidated tows 20 and have different properties and characteristics from the pre-consolidated tows. Supplies 28 may take the form of spools of elongate structures 30. Similar to a pre-consolidated tow 20, however, an elongate structure 30 has a length that is significantly greater than a diameter of the elongate structure 30. As illustrative, non-exclusive examples, elongate structures 30 may have lengths that are at least 1000, at least 10000, at least 100000, or at least 1000000 times greater than their diameters. Additionally or alternatively, an elongate structure 30 may be as long as reasonable within the confines of material management of the elongate structure 30.

The properties and characteristics of the elongate structures 30 may be selected for any suitable purpose, including for example, to imbed an electrical or optical path within the macro tow 26 and thus within a composite part 12 being manufactured. As illustrative, non-exclusive examples, an elongate structure 30 may comprise one or more of an optical fiber, a wire, a metal wire, a conductive wire, a wire bundle, sensor(s), circuitry, a hollow tube, a foam, and a magnetic material. Additionally or alternatively, elongate structures 30 may be selected for a functional purpose and/or a structural purpose.

As with pre-consolidated tows 20, elongate structure 30 may have any suitable cross-sectional profiles, such as depending on a particular application or property of a composite part 12 being manufactured, or depending on a combining configuration of the tow combiner 16, as discussed herein. As illustrative, non-exclusive examples, elongate structures 30 may have cross-sectional profiles that are circular, polygonal, triangular, quadrilateral, rhombus-shaped, trapezoidal, symmetrical, and/or asymmetrical, with such profiles optionally being described as generally circular, generally polygonal, generally triangular, generally quadrilateral, generally rhombus-shaped, generally trapezoidal, generally symmetrical, and/or generally asymmetrical.

With continued reference to FIG. 1, in some examples of system 10, the tow combiner 16 may comprise, or be described as, a die 34, such as configured to shape the macro tow 26 being defined by the tow combiner 16. In some examples, tow combiner 16 comprises a plurality of inlets 36 with each inlet 36 of at least a first subset of the inlets 36 configured to receive an individual pre-consolidated tow 20 from the feedstock source 14. In some such examples, each inlet 36 of at least a second subset of the inlets 36 is configured to receive an individual elongate structure 30 from the feedstock source 14. In some examples, the tow combiner 16 further comprises a plurality of outlets corresponding to the plurality of inlets 36. For example, in some such examples, the inlets 36 may be spaced further apart from each other than the outlets, such that when the pre-consolidated tows 20 exit the outlets, they are directed toward each other and thus come into contact with each other to define the macro tow 26. In some examples, the tow combiner 16 comprises fewer outlets than inlets 36, with subsets of inlets 36 converging to respective outlets for optionally dispensing more than one macro tow 26. In other examples, the tow combiner 16 comprises a single outlet 38, as schematically represented in FIG. 1, and the inlets 36 converge to the single outlet 38 for dispensing the macro tow 26 from the tow combiner 16.

In some examples, tow combiner 16 is configured to heat the pre-consolidated tows 20 and/or the macro tow 26 as they pass through the tow combiner 16, such as to facilitate adhesion between the pre-consolidated tows 20 within the macro tow 26 and/or between adjacent lengths of macro tow(s) 26 as a composite part 12 is being manufactured.

Turning now to FIGS. 2-9, which schematically represent example tow combiners 16, in some examples of tow combiners 16, the inlets 36 are arranged in an array that is configured to selectively define a plurality of shapes corresponding to cross-sectional profiles of the macro tow 26 based on which subsets of the inlets 36 into which the pre-consolidated tows 20, and optionally elongate structures 30, are received. In FIGS. 2-9, the inlets are schematically represented as circles, but inlets 36 are not limited to being circular. In FIGS. 2-5, the array of inlets 36 is a rectangular array, and in FIGS. 6-9, the array of inlets 36 is a hexagonal array; however, other shapes and configurations of arrays may be used. In FIGS. 2-9, the pre-consolidated tows 20 being received by a subset of the inlets 36 are represented with cross-hatching to distinguish inlets 36 being utilized in a given example from inlets 36 not being utilized in a given example.

The tow combiner 16 therefore may be configured to define various cross-sectional profiles of a macro tow 26 depending on which inlets 36 of the array are utilized at a given time. As illustrative, non-exclusive examples, the tow combiner 16 may be configured to define a cross-sectional profile of the macro tow 26 that is circular, polygonal, triangular, quadrilateral, rhombus-shaped, trapezoidal, symmetrical, and/or asymmetrical, or optionally that is generally circular, generally polygonal, generally triangular, generally quadrilateral, generally rhombus-shaped, generally trapezoidal, generally symmetrical, and/or generally asymmetrical.

FIG. 2 schematically represents a rectangular array of inlets 36 being utilized to define a rectangular, non-square macro tow 26. FIG. 3 schematically represents a rectangular array of inlets 36 being utilized to define a square macro tow 26, with a square core of elongate structures 30 embedded within a border of pre-consolidated tows 20. FIGS. 4 and 5 both schematically represent rectangular arrays of inlets 36 being utilized to define trapezoidal macro tows 26. FIG. 6 schematically represents a hexagonal array of inlets 36 (i.e., with every other row and column of inlets 36 being offset from the previous row and column by one-half a distance between adjacent inlets 36) being utilized to define a trapezoidal macro tow 26. FIG. 7 schematically represents a hexagonal array of inlets 36 being utilized to define a hexagonal macro tow 26. FIG. 8 schematically represents a hexagonal array of inlets 36 being utilized to define a triangular macro tow 26. Finally, FIG. 9 schematically represents a hexagonal array of inlets 36 being utilized to define a rectangular macro tow 26. Other examples of arrays of inlets 36 and shapes and configurations of macro tows 26 are within the scope of the present disclosure, and FIGS. 2-9 are intended to provide only an illustrative subset of such possible examples. For example, hollow macro tows 26 may be created by not feeding pre-consolidated tows 20 or elongate structures 30 into one or more inner inlets 36 that are surrounded by inlets 36 into which pre-consolidated tows 20 or elongate structures 30 are fed. Additionally or alternatively, a tow combiner 16 may be used to define two or more spaced-apart macro tows 26 with the two or more macro tows 26 having any desired shape and optionally different shapes. That is, an array of inlets 36 may be configured to permit for a first set of pre-consolidated tows 20 (and optional elongate structure(s) 30) to define a first macro tow 26 and for a second set of pre-consolidated tows 20 (and optional elongate structure(s) 30) to define a second macro tow 26.

In some examples of systems 10, the tow combiner 16 is configured to selectively and/or actively alter a shape of the cross-sectional profile of the macro tow 26 as the macro tow 26 is being defined by the tow combiner 16. For example, with reference to the examples of FIGS. 2-9, while a composite part 12 is being manufactured, the inlets 36 through which pre-consolidated tows 20, and optionally elongate structures 30, are received may be selectively and actively changed as the pre-consolidated tows 20, and optionally the elongate structures 30, are being fed by the feed mechanism 18. Additionally or alternatively, the quantity of the pre-consolidated tows 20, and optionally the elongate structures 30, that are received by the inlets 36 may increase and/or decrease over time.

Turning back to FIG. 1, in some systems 10, the feed mechanism 18 is configured to engage the macro tow 26 to move pre-consolidated tows 20 and the macro tow 26 relative to the tow combiner 16. That is, as mentioned, the feed mechanism 18 may be described as being downstream of the tow combiner 16. In some such examples, the feed mechanism 18 includes a pair of opposing rollers 40 that are positioned to engage opposed sides of the macro tow 26, with at least one, and in some examples both, of the pair of opposing rollers 40 being configured to be selectively rotated, such as by a motor.

In some systems 10, the feed mechanism 18 is configured to engage the pre-consolidated tows 20 to move the pre-consolidated tows 20 (and optionally one or more elongate structures 30) and the macro tow 26 relative to the tow combiner. That is, as mentioned, the feed mechanism 18 may be described as being upstream of the tow combiner 16. In some such examples, the feed mechanism 18 includes a plurality of pairs of opposing rollers 40 with each pair of opposing rollers 40 being configured to engage opposed sides of a respective pre-consolidated tow 20 (or optional elongate structure), with at least one, and in some examples both, of each pair of opposing rollers 40 being configured to be selectively rotated, such as by a motor.

In some systems 10, the feed mechanism 18 is configured to selectively start and stop movement of a selection of the plurality of pre-consolidated tows (and optionally one or more elongate structures 30) to actively alter a cross-sectional profile and/or size of the macro tow 26 as the macro tow 26 is being defined. In some such examples, the feed mechanism 18 may work in conjunction with a tow combiner 16 having an array of inlets 36 as discussed herein to actively alter a shape and/or size of the macro tow 26 as the macro tow 26 is being defined and as the composite part 12 is being manufactured. Accordingly, a composite part 12 may be constructed of more than one shape and/or size of macro tow 26, which may be desirable for various reasons, including desired properties and characteristics of the composite part 12 and subparts thereof.

In some examples, the feed mechanism 18 is configured to selectively move individual pre-consolidated tows 20 (and optionally one or more elongate structures 30) at different rates to actively define curvatures in the macro tow 26 as the macro tow 26 is being defined. For example, with reference to the example tow combiner 16 schematically represented in FIG. 2, if the pre-consolidated tows 20 are moved faster toward the right side of the figure than the pre-consolidated tows 20 toward the left side of the figure, then the feed mechanism 18 will impart a curvature in the macro tow 26 to the left. Moreover, the selective movement of individual pre-consolidated tows 20 at different rates may be actively controlled during manufacture of a composite part 12 to actively direct the macro tow 26 as it exits the tow combiner 16. In some such examples, a separate drive assembly 44 of the system 10, as discussed herein, may not be required. Alternatively, in some such examples, the active curving of the macro tow 26 by the tow combiner 16 may work in conjunction with a drive assembly 44.

In examples of feed mechanism 18 that comprise pairs of opposing rollers 40, the feed mechanism 18 may be configured to selectively rotate at least one of each pair of opposing rollers 40 at different rates to actively define desired curvatures in the macro tow 26 as the macro tow 26 is being defined and as the composite part 12 is being manufactured.

With reference again to FIG. 1, some systems 10 further comprise a delivery guide 42 that is positioned to receive the macro tow 26 from the tow combiner 16 and dispense the macro tow 26. In FIG. 1 the delivery guide 42 is schematically illustrated in an overlapping relationship with the tow combiner 16, schematically representing that in some examples the tow combiner 16 comprises the delivery guide 42 and/or is integral with the delivery guide, and in some examples, the delivery guide 42 is coupled to the tow combiner 16. However, it also is within the scope of the present disclosure that the delivery guide 42, when present, may be spaced-apart from the tow combiner 16. The delivery guide 42 additionally or alternatively may be described as a nozzle for dispensing the macro tow 26.

When a system 10 comprises a delivery guide 42, the feed mechanism 18 is further configured to move the macro tow 26 into the delivery guide 42, through the delivery guide 42, and out of the delivery guide 42.

In some examples, the delivery guide 42 is configured to rotate relative to the tow combiner 16 to twist the macro tow 26 as it is being dispensed from the delivery guide 42.

In some examples, the delivery guide 42 may be configured to heat the macro tow 26 as it is being dispensed from the delivery guide 42. For example, such a configuration may facilitate desired placement and curvature of the macro tow 26 as a composite part 12 is being manufactured. Additionally or alternatively, in some examples, the delivery guide 42 may be configured to deliver another form of energy to the macro tow 26 as it is being dispensed from the delivery guide 42, with examples including (but not limited to) ultra-violet light, x-rays, and electron beams. Additionally or alternatively, the delivery guide 42 may be configured to deliver a chemical to the macro tow 26 that is selected to alter the macro tow 26 in some desired fashion.

In some examples, the delivery guide 42 is configured to be actively positioned to dispense the macro tow 26 to additively manufacture the composite part 12. For example, as schematically and optionally illustrated in FIG. 1, some systems 10 further comprise a drive assembly 44 that is operatively coupled to the delivery guide 42 and configured to selectively move the delivery guide 42 in three dimensions to additively manufacture the composite part 12. As illustrative, non-exclusive examples, the drive assembly 44 may comprise one or more of a robotic arm and a print head drive assembly that facilitates movement of the delivery guide 42 in multiple degrees of freedom. In some examples, the drive assembly 44 may be configured to move the delivery guide 42 orthogonally in three dimensions. In some examples, the drive assembly 44 may be configured to move the delivery guide 42 in three dimensions with at least three degrees of freedom, with at least six degrees of freedom, with at least nine degrees of freedom, or with at least twelve degrees of freedoms. Such examples permit for complex three-dimensional composite parts 12 to be manufactured.

As schematically and optionally represented in FIG. 1, some systems 10 further comprise an adhesive source 46 that is configured to deliver an adhesive 48 to one or more of the pre-consolidated tows 20 being fed to the tow combiner 16 and the macro tow 26 to adhere the pre-consolidated tows 20 together and/or to further define the macro tow 26 and thus to adhere together spaced apart portions of the macro tow 26 as the composite part 12 is being manufactured. In some such examples, the adhesive source 46 is further configured to deliver the adhesive 48 to one or more elongate structures 30 being fed to the tow combiner 16 to adhere such elongate structure(s) 30 and the pre-consolidated tows 20 together to further define the macro tow 26.

Adhesive 48 may take any suitable form, including liquid, paste, and/or film forms and may be delivered utilizing any suitable process or mechanism, such as (but not limited to) dripping, spraying, pumping, and injecting the adhesive. Additionally or alternatively, a volume, or bath, of the adhesive 48 may be provided, through which the pre-consolidated tows 20, optionally one or more elongate structures 30, and/or the macro tow 26 are pulled by the feed mechanism 18. In some examples, the adhesive source 46 is configured to deliver the adhesive 48 to the macro tow 26 within the optional delivery guide 42, when present.

In some examples, the adhesive 48 is a different material from the non-liquid binding matrix 24. In other examples, the adhesive 48 is a liquid state of the non-liquid binding matrix 24. Illustrative, non-exclusive examples of adhesive include (but are not limited to) polymers, resins, thermoplastics, thermosets, photopolymers, ultra-violet photopolymers, visible-light photopolymers, infrared-light photopolymers, x-ray photopolymers, and epoxies.

Also within the scope of the present disclosure are systems that comprise a feedstock source 14, a feed mechanism 18, and an adhesive source 46 configured to deliver the adhesive 48 to a pre-consolidated tow to adhere together spaced-apart portions of the pre-consolidated tows as the composite part is being manufactured. In some such systems, the system does not include a tow combiner 16.

As schematically illustrated in FIG. 1, systems 10 may be used to additively manufacture a composite part 12 in three dimensions without requiring a substrate, an underlying mold, or sacrificial layer, such as by defining the composite part with lengths 50 of a macro tow 26 or macro tows 26 extending between nodes 52 of the macro tow(s) 26. Additionally or alternatively, systems 10 may be used to additively manufacture a composite part 12 by delivering a macro tow 26 or macro tows 26 into layers 54 of the macro tow(s) 26. Illustrative, non-exclusive examples of such a configuration are illustrated in FIGS. 10-13. In each of the examples of FIGS. 10-13, an upper layer 54a represents a 0° layer with the macro tow(s) 26 and the corresponding fiber tows 22 extending into and out of the page, a middle layer 54b represents a 90° layer with the macro tow(s) and the corresponding fiber tows 22 extending in the plane of the page, and a lower layer 54c with a 45° layer with the macro tow(s) 26 and the corresponding fiber tows 22 extend through the page at a 45° angle. In all four examples, an adhesive 48 was applied to adhere together the lengths of macro tow(s) 26 in each layer and amongst the layers. In FIG. 10, a circular macro tow 26 is represented. In FIG. 11, a triangular macro tow 26 is represented. In FIG. 12, a trapezoidal macro tow 26 is represented. In FIG. 13, a rectangular macro tow 26 is represented. Other examples, as understood herein, also are within the scope of the present disclosure. Moreover, as seen with reference to the examples of FIGS. 11-13, polygonal macro tows 26 may advantageously stack and/or layer in an efficient manner, and thereby reduce the volume of adhesive 48 utilized in the construction of a composite part 12 when compared to use of circular macro tows 26, as seen in FIG. 10. Such stacking or layering of polygonal macro tows 26 may be described as nesting the macro tow 26 against itself or against an adjacent macro tow 26. Additionally or alternatively, such as in connection with the examples of FIGS. 11 and 12, the nesting may involve inverting the orientation of the cross-sectional profile of the macro tow 26 between adjacent lengths of the macro tow 26. Again, such a construction may facilitate a reduction in the volume of adhesive 48 utilized, and in some examples no adhesive 48 may be required or utilized.

While FIG. 1 schematically illustrates only a single tow combiner 16, systems 10 may comprise more than one tow combiner 16 that collectively feed macro tows 26 into one or more downstream tow combiners 16 to define macro-macro tows 26, that is a macro tow 26 that is constructed of multiple macro tows 26 having been defined upstream in upstream tow combiners 16. Any number of tow combiners 16 and quantity of sequential combinations of macro tows 26 may be incorporated into a system 10. Accordingly, complex macro tows 26 may be created from lesser macro tows 26 that are twisted, braided, woven, or otherwise combined together.

FIG. 14 schematically provides a flowchart that represents illustrative, non-exclusive examples of methods according to the present disclosure. In FIG. 14, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 14 are not limiting and other methods and steps are within the scope of the present disclosure, including methods having greater than or fewer than the number of steps illustrated, as understood from the discussions herein.

With reference to FIG. 14, methods 100 of additively manufacturing a composite part 12 are disclosed herein. Methods 100 may (but are not required to) be implemented by a system 10. That said, reference numerals corresponding to aspects of systems 10 may be used for corresponding aspects associated with methods 100, with such corresponding aspects optionally being, but not required to be, the specific aspects of systems 10 as initially introduced herein.

Methods 100 comprise at least the steps of combining 102 a plurality of pre-consolidated tows 20 to define a macro tow 26, with each pre-consolidated tow 20 comprising a fiber tow 22 within a non-liquid binding matrix 24, and dispensing 104 the macro tow 26 in three dimensions to define the composite part 12.

In some examples, the combining 102 comprises combining the pre-consolidated tows 20 with one or more elongate structures 30.

In some examples, the combining 102 comprises feeding the pre-consolidated tows 20 into a corresponding plurality of inlets 36. In some such examples, in which the combining 102 comprises combining the pre-consolidated tows 20 with one or more elongate structures 30, the combining 102 also comprises feeding the one or more elongate structures 30 into a corresponding one or more inlets 36. In some examples, the inlets 36 converge to a single outlet 38, and the dispensing 104 comprises dispensing the macro tow 26 from the single outlet 38.

In some examples, and with reference again to FIGS. 2-9 and the discussion thereof above, the inlets 36 are arranged in an array configured to selectively define a plurality of shapes corresponding to cross-sectional profiles of the macro tow 26 based on into which subsets of the inlets 36 the pre-consolidated tows 26 are fed.

In some examples, the combining 102 comprises defining a cross-sectional profile of the macro tow that is circular, polygonal, triangular, quadrilateral, rhombus-shaped, trapezoidal, symmetrical, and/or asymmetrical, or optionally that is generally circular, generally polygonal, generally triangular, generally quadrilateral, generally rhombus-shaped, generally trapezoidal, generally symmetrical, and/or generally asymmetrical.

In some examples, the combining 102 comprises actively altering a shape of the cross-sectional profile of the macro tow 26 as the macro tow 26 is being defined and the composite part is being manufactured. In some such examples, the actively altering comprises actively feeding the pre-consolidated tows 20 into a predetermined subset of the inlets 36.

With reference again to the example composite parts 12 of FIGS. 11-13, when the macro tow 26 has a cross-sectional profile that is polygonal or generally polygonal, the dispensing 104 may comprise nesting the macro tow 26 against itself.

As schematically and optionally indicated in FIG. 14, some methods 100 further comprise selectively stopping and starting 106 a feed of a selection of the pre-consolidated tows 20 to alter a cross-sectional profile and/or size of the macro tow 26 as the macro tow 26 is being defined. For example, as discussed herein with respect to optional configurations of systems 10, such an example method 100 may be facilitated by a feed mechanism 18.

As also schematically and optionally indicated in FIG. 14, some methods 100 further comprise feeding 108 pre-consolidated tows 20 at different rates to impart a curvature in the macro tow 26 as the macro tow 26 is being defined. Again, such a method 100 may be facilitated by a feed mechanism 18 of a system 10, as discussed herein.

As also schematically and optionally indicated in FIG. 14, some methods further comprise applying 110 an adhesive 48 to the plurality of pre-consolidated tows to, for example, adhere the pre-consolidated tows 20 together to further define the macro tow 26 and/or to adhere together spaced-apart portions of the macro tow 26 as the composite part 12 is being manufactured. In some such examples, the applying 110 further comprises applying the adhesive 48 to one or more elongate structures 30 to adhere them and the pre-consolidated tows 20 together to further define the macro tow 26. In yet further such examples, the applying 110 comprises one or more of dripping the adhesive 48, spraying the adhesive 48, and drawing the pre-consolidated tows 20 and optionally one or more elongate structures 30 through a volume of the adhesive 48.

Also within the scope of the present disclosure are methods of additively manufacturing a composite part by applying an adhesive to a pre-consolidated tow and dispensing the pre-consolidated tow with the adhesive in three dimensions to define the composite part.

Systems 10 and methods 100 may further include, have, or otherwise be associated with, any other various components, aspects, configurations, characteristics, properties, steps, etc. for operatively manufacturing composite parts 12. For example, depending on the nature of the non-liquid binding matrix 24 and the optional adhesive 48 utilized by a system 10 or a method 100, a source of curing energy may be incorporated into a system 10 and/or be used by a method 100. Illustrative, non-exclusive examples of such various optional components, aspects, configurations, characteristics, properties, steps, etc. are disclosed in U.S. patent application Ser. Nos. 14/841,423; 14/841,470; 14/920,748; 14/931,573; 14/995,507; and Ser. No. 15/063,400, the disclosures of which are incorporated herein by reference.

Illustrative, non-exclusive examples of inventive subject matter according to the present disclosure are described in the following enumerated paragraphs:

A. A system for additively manufacturing a composite part, the system comprising:

a feedstock source comprising a plurality of pre-consolidated tows, wherein each pre-consolidated tow comprises a fiber tow within a non-liquid binding matrix; and a feed mechanism configured to move a subset of the plurality of pre-consolidated tows from the feedstock source.

A1. The system of paragraph A, wherein the fiber tow comprises one or more of a carbon fiber, a glass fiber, a synthetic organic fiber, an aramid fiber, a natural fiber, a wood fiber, a boron fiber, a silicon-carbide fiber, a ceramic fiber, an optical fiber, a fiber bundle, a fiber weave, a fiber braid, a wire, a metal wire, a conductive wire, and a wire bundle.

A2. The system of any of paragraphs A-A1, wherein the non-liquid binding matrix comprises one or more of a polymer, a resin, a thermoplastic, a thermoset, a photopolymer, an ultra-violet photopolymer, a visible-light photopolymer, an infrared-light photopolymer, an x-ray photopolymer, a partially cured binding matrix, a fully cured binding matrix, and an epoxy.

A3. The system of any of paragraphs A-A2, wherein the feedstock source comprises spools of the plurality of pre-consolidated tows.

A4. The system of any of paragraphs A-A3, wherein the pre-consolidated tows have cross-sectional profiles that are circular, polygonal, triangular, a quadrilateral, a rhombus, trapezoidal, symmetrical, and/or asymmetrical, optionally that are generally circular, generally polygonal, generally triangular, generally quadrilateral, generally rhombus-shaped, generally trapezoidal, generally symmetrical, and/or generally asymmetrical.

A5. The system of any of paragraphs A-A4, further comprising:

a tow combiner positioned to receive at least a subset of the plurality of pre-consolidated tows from the feedstock source, and wherein the tow combiner is configured to combine the subset of the plurality of pre-consolidated tows to define a macro tow;

wherein the feed mechanism is configured to move the subset of the plurality of pre-consolidated tows from the feedstock source and into the tow combiner and to move the macro tow from the tow combiner.

A5.1. The system of paragraph A5, wherein the non-liquid binding matrix is self-adherent, such that when the pre-consolidated tows are combined by the tow combiner, the subset of the plurality of pre-consolidated tows adhere to each other to define the macro tow.

A5.2. The system of any of paragraphs A5-A5.1, wherein the feedstock source further comprises one or more elongate structures; and wherein the tow combiner is positioned to receive at least a subset of the one or more elongate structures, and wherein the tow combiner is further configured to combine the subset of the one or more elongate structures with the subset of the plurality of pre-consolidated tows to define the macro tow.

A5.2.1. The system of paragraph A5.2, wherein the elongate structures are free of a binding matrix.

A5.2.2. The system of any of paragraphs A5.2-A5.2.1, wherein the elongate structures are not the pre-consolidated tows.

A5.2.3. The system of any of paragraphs A5.2-A5.2.2, wherein the each elongate structure comprises one or more of an optical fiber, a wire, a metal wire, a conductive wire, a wire bundle, a sensor, circuitry, a hollow tube, a foam, and a magnetic material.

A5.2.4. The system of any of paragraphs A5.2-A5.2.3, wherein the feedstock source comprises one or more spools of the one or more elongate structures.

A5.2.5. The system of any of paragraphs A5.2-A5.2.4, wherein the one or more elongate structures have cross-sectional profiles that are circular, polygonal, triangular, quadrilateral, rhombus-shaped, trapezoidal, symmetrical, and/or asymmetrical, optionally that are generally circular, generally polygonal, generally triangular, generally quadrilateral, generally rhombus-shaped, generally trapezoidal, generally symmetrical, and/or generally asymmetrical.

A5.3. The system of any of paragraphs A5-A5.2.5, further comprising:

a plurality of pre-consolidated tow conduits through which the subset of the plurality of pre-consolidated tows respectively extend between the feedstock source and the tow combiner.

A5.4. The system of any of paragraphs A5-A5.3, wherein the tow combiner comprises a die.

A5.5. The system of any of paragraphs A5-A5.4, wherein the tow combiner comprises a plurality of inlets with each inlet of at least a first subset of the plurality of inlets configured to receive an individual pre-consolidated tow of the subset of the plurality of pre-consolidated tows.

A5.5.1. The system of paragraph A5.5 when depending from paragraph A5.2, wherein each inlet of at least a second subset of the plurality of inlets is configured to receive an individual elongate structure of the one or more elongate structures.

A5.5.2. The system of any of paragraphs A5.5-A5.5.1, wherein the tow combiner further comprises a plurality of outlets corresponding to the plurality of inlets.

A5.5.3. The system of any of paragraphs A5.5-A5.5.1, wherein the tow combiner further comprises a single outlet, and wherein the inlets of the plurality of inlets converge to the single outlet for dispensing the macro tow from the tow combiner.

A5.5.4. The system of any of paragraphs A5.5-A5.5.3, wherein the inlets of the plurality of inlets are arranged in an array configured to selectively define a plurality of cross-sectional profiles of the macro tow.

A5.5.4.1. The system of paragraph A5.5.4, wherein the array is a rectangular array.

A5.5.4.2. The system of paragraph A5.5.4, wherein the array is a hexagonal array.

A5.6. The system of any of paragraphs A5-A5.5.4.2, wherein the tow combiner is configured to define a cross-sectional profile of the macro tow that is circular, polygonal, triangular, quadrilateral, rhombus-shaped, trapezoidal, symmetrical, and/or asymmetrical, optionally that is generally circular, generally polygonal, generally triangular, generally quadrilateral, generally rhombus-shaped, generally trapezoidal, generally symmetrical, and/or generally asymmetrical.

A5.7. The system of any of paragraphs A5-A5.6, wherein the tow combiner is configured to selectively alter a shape of a/the cross-sectional profile of the macro tow as the macro tow is being defined by the tow combiner.

A5.8. The system of any of paragraphs A5-A5.7, wherein the feed mechanism is configured to engage the macro tow to move the subset of the plurality of pre-consolidated tows and the macro tow relative to the tow combiner.

A5.8.1. The system of paragraph A5.8, wherein the feed mechanism includes a pair of opposing rollers positioned to engage opposed sides of the macro tow, wherein at least one of the pair of opposing rollers is configured to be selectively rotated.

A5.9. The system of any of paragraphs A5-A5.8.1, wherein the feed mechanism is configured to engage the subset of the plurality of pre-consolidated tows to move the subset of the plurality of pre-consolidated tows and the macro tow relative to the tow combiner.

A5.9.1. The system of paragraph A5.9, wherein the feed mechanism includes a plurality of pairs of opposing rollers with each pair of opposing rollers configured to engage opposed sides of a respective pre-consolidated tow of the subset of the plurality of pre-consolidated tows, wherein at least one of each pair of opposing rollers is configured to be selectively rotated.

A5.9.2. The system of any of paragraphs A5.9-A5.9.1, wherein the feed mechanism is configured to selectively start and stop movement of a selection of the plurality of pre-consolidated tows to actively alter a cross-sectional profile and/or size of the macro tow as the macro tow is being defined.

A5.9.3. The system of any of paragraphs A5.9-A5.9.2, wherein the feed mechanism is configured to selectively move individual pre-consolidated tows of the subset of the plurality of pre-consolidated tows at different rates to actively define curvatures in the macro tow as the macro tow is being defined.

A5.9.3.1. The system of paragraph A5.9.3 when depending from paragraph A5.9.1, wherein the feed mechanism is configured to selectively rotate the at least one of each pair of opposing rollers at different rates to actively define curvatures in the macro tow as the macro tow is being defined.

A5.10. The system of any of paragraphs A-A5.9.3.1, further comprising:

a delivery guide positioned to receive the macro tow from the tow combiner and dispense the macro tow.

A5.10.1 The system of paragraph A5.10, wherein the feed mechanism is further configured to move the macro tow into the delivery guide, through the delivery guide, and out of the delivery guide.

A5.10.2. The system of any of paragraphs A5.10-A5.10.1, wherein the delivery guide is coupled to the tow combiner.

A5.10.3. The system of any of paragraphs A5.10-A5.10.2, wherein the delivery guide is integral with the tow combiner.

A5.10.4. The system of any of paragraphs A5.10-A5.10.1, wherein the delivery guide comprises the tow combiner.

A5.10.5. The system of any of paragraphs A5.10-A5.10.1, wherein the delivery guide is spaced apart from the tow combiner.

A5.10.6. The system of any of paragraphs A5.10-A5.10.5, wherein the delivery guide is configured to rotate relative to the tow combiner to twist the macro tow.

A5.10.7. The system of any of paragraphs A5.10-A5.10.6, wherein the delivery guide is configured to be actively positioned to dispense the macro tow to additively manufacture the composite part.

A5.10.8. The system of any of paragraphs A5.10-A5.10.7, further comprising:

a drive assembly operatively coupled to the delivery guide and configured to selectively move the delivery guide in three dimensions to additively manufacture the composite part.

A6. The system of any of paragraphs A-A5.10.8, further comprising:

an adhesive source configured to deliver an adhesive.

A6.1. The system of paragraph A6, wherein the adhesive source is configured to deliver the adhesive to the subset of the plurality of pre-consolidated tows to adhere together spaced-apart portions of the subset of the plurality of pre-consolidated tows as the composite part is being manufactured.

A6.2. The system of paragraph A6 when depending from paragraph A5, wherein the adhesive source is configured to deliver the adhesive to one or more of the subset of the plurality of pre-consolidated tows and the macro tow to one or both of adhere the subset of the plurality of pre-consolidated tows together to further define the macro tow and to adhere together spaced-apart portions of the macro tow as the composite part is being manufactured.

A6.2.1. The system of paragraph A6.2 when depending from paragraph A5.2, wherein the adhesive source is further configured to deliver the adhesive to the one or more elongate structures to adhere the one or more elongate structures and the subset of the plurality of pre-consolidated tows together to further define the macro tow.

A6.2.2. The system of any of paragraphs A6.2-A6.2.1, wherein deliver the adhesive comprises one or more of drip the adhesive and spray the adhesive.

A6.2.3. The system of any of paragraphs A6.2-A6.2.2, wherein deliver the adhesive comprises provide a volume of the adhesive through which one or more of the subset of the plurality of pre-consolidated tows, a/the one or more elongate structures, and the macro tow are pulled by the feed mechanism.

A6.2.4. The system of any of paragraphs A6.2-A6.2.3 when depending from paragraph A14, wherein the adhesive source is configured to deliver the adhesive to the macro tow within the delivery guide.

A6.2.5. The system of any of paragraphs A6.2-A6.2.4, wherein the adhesive is a different material from the non-liquid binding matrix.

A6.2.6. The system of any of paragraphs A6.2-A6.2.4, wherein the adhesive is a liquid state of the non-liquid binding matrix.

A6.2.7. The system of any of paragraphs A6.2-A6.2.6, wherein the adhesive comprises one or more of a polymer, a resin, a thermoplastic, a thermoset, a photopolymer, an ultra-violet photopolymer, a visible-light photopolymer, an infrared-light photopolymer, an x-ray photopolymer, and an epoxy.

A7. The system of any of paragraphs A-A6.2.7, wherein the system is configured to perform the method of any of paragraphs B-B12.5.

A8. The use of the system of any of paragraphs A-A7 to additively manufacture a composite part.

B. A method of additively manufacturing a composite part, the method comprising:

combining a plurality of pre-consolidated tows to define a macro tow, wherein each pre-consolidated tow comprises a fiber tow within a non-liquid binding matrix; and dispensing the macro tow in three dimensions to define the composite part.

B1. The method of paragraph B, wherein the fiber tow comprises one or more of a carbon fiber, a glass fiber, a synthetic organic fiber, an aramid fiber, a natural fiber, a wood fiber, a boron fiber, a silicon-carbide fiber, a ceramic fiber, an optical fiber, a fiber bundle, a fiber weave, a fiber braid, a wire, a metal wire, a conductive wire, and a wire bundle.

B2. The method of any of paragraphs B-B1, wherein the non-liquid binding matrix comprises one or more of a polymer, a resin, a thermoplastic, a thermoset, a photopolymer, an ultra-violet photopolymer, a visible-light photopolymer, an infrared-light photopolymer, an x-ray photopolymer, a partially cured binding matrix, a fully cured binding matrix, and an epoxy.

B3. The method of any of paragraphs B-B2, wherein the non-liquid binding matrix is self-adherent, such that the combining comprises adhering together the plurality of pre-consolidated tows.

B4. The method of any of paragraphs B-B3, wherein the combining comprises combining the plurality of pre-consolidated tows with one or more elongate structures.

B4.1. The method of paragraph B4, wherein the elongate structures are free of a binding matrix.

B4.2. The method of any of paragraphs B4-B4.1, wherein the elongate structures are not the pre-consolidated tows.

B4.3. The method of any of paragraphs B4-B4.2, wherein the each elongate structure comprises one or more of an optical fiber, a wire, a metal wire, a conductive wire, a wire bundle, a sensor, circuitry, a hollow tube, a foam, and a magnetic material.

B4.4. The method of any of paragraphs B4-B4.3, wherein the one or more elongate structures have cross-sectional profiles that are circular, polygonal, triangular, quadrilateral, rhombus-shaped, trapezoidal, symmetrical, and/or asymmetrical, optionally that are generally circular, generally polygonal, generally triangular, generally quadrilateral, generally rhombus-shaped, generally trapezoidal, generally symmetrical, and/or generally asymmetrical.

B5. The method of any of paragraphs B-B4.4, wherein the pre-consolidated tows have cross-sectional profiles that are circular, polygonal, triangular, a quadrilateral, a rhombus, trapezoidal, symmetrical, and/or asymmetrical, optionally that are generally circular, generally polygonal, generally triangular, generally quadrilateral, generally rhombus-shaped, generally trapezoidal, generally symmetrical, and/or generally asymmetrical.

B6. The method of any of paragraphs B-B5, wherein the combining comprises feeding the plurality of pre-consolidated tows into a corresponding plurality of inlets.

B6.1. The method of paragraph B6 when depending from paragraph B4, wherein the combining comprises feeding the one or more elongate structures into a corresponding one or more inlets.

B6.2. The method of any of paragraphs B6-B6.1, wherein the inlets converge to a single outlet, wherein the dispensing comprises dispensing the macro tow from the single outlet.

B6.3. The method of any of paragraphs B6-B6.2, wherein the inlets are arranged in an array configured to selectively define a plurality of shapes corresponding to cross-sectional profiles of the macro tow based on into which subsets of the inlets the plurality of pre-consolidated tows are fed.

B7. The method of any of paragraphs B-B6.3, wherein the combining comprises defining a cross-sectional profile of the macro tow that is circular, polygonal, triangular, quadrilateral, rhombus-shaped, trapezoidal, symmetrical, and/or asymmetrical, optionally that is generally circular, generally polygonal, generally triangular, generally quadrilateral, generally rhombus-shaped, generally trapezoidal, generally symmetrical, and/or generally asymmetrical.

B8. The method of any of paragraphs B-B7, wherein the combining comprises actively altering a shape of a/the cross-sectional profile of the macro tow.

B8.1. The method of paragraph B8 when depending from paragraph B6.3, wherein the actively altering comprises actively feeding the plurality of pre-consolidated tows into a predetermined subset of the inlets.

B9. The method of any of paragraphs B-B8.1, wherein the macro tow has a cross-sectional profile that is polygonal or generally polygonal, and wherein the dispensing comprises nesting the macro tow against itself.

B10. The method of any of paragraphs B-B9, further comprising:

selectively stopping and starting a feed of a selection of the plurality of pre-consolidated tows to alter a cross-sectional profile and/or size of the macro tow as the macro tow is being defined.

B11. The method of any of paragraphs B-B10, further comprising:

feeding pre-consolidated tows of the plurality of pre-consolidated tows at different rates to impart a curvature in the macro tow as the macro tow is being defined.

B12. The method of any of paragraphs B-B11, further comprising:

applying an adhesive to the plurality of pre-consolidated tows to one or both of adhere the plurality of pre-consolidated tows together to further define the macro tow and to adhere together spaced-apart portions of the macro tow as the composite part is being manufactured.

B12.1. The method of paragraph B12 when depending from paragraph B4, wherein the applying further comprises applying the adhesive to the one or more elongate structures to adhere the one or more elongate structures and the plurality of pre-consolidated tows together to further define the macro tow.

B12.2. The method of any of paragraphs B12-B12.1, wherein the applying comprises one or more of dripping the adhesive, spraying the adhesive, and drawing the plurality of pre-consolidated tows and optionally a/the one or more elongate structures through a volume of the adhesive.

B12.3. The method of any of paragraphs B12-B12.2, wherein the adhesive is a different material from the non-liquid binding matrix.

B12.4. The method of any of paragraphs B12-B12.3, wherein the adhesive is a liquid state of the non-liquid binding matrix.

B12.5. The method of any of paragraphs B12-B12.4, wherein the adhesive comprises one or more of a polymer, a resin, a thermoplastic, a thermoset, a photopolymer, an ultra-violet photopolymer, a visible-light photopolymer, an infrared-light photopolymer, an x-ray photopolymer, and an epoxy.

B13. The method of any of paragraphs B-B12.5, performed by the system of any of paragraphs A-A7.

C. A method of additively manufacturing a composite part, the method comprising:

applying an adhesive to a pre-consolidated tow, wherein the pre-consolidated tow comprises a fiber tow within a non-liquid binding matrix; and dispensing the pre-consolidated tow with the adhesive in three dimensions to define the composite part.

C1. The method of paragraph C, further comprising the subject matter of any of paragraphs B-B13.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A system for additively manufacturing a composite part, the system comprising:
   a feedstock source comprising a plurality of pre-consolidated tows, wherein each pre-consolidated tow comprises a fiber tow within a non-liquid binding matrix;
   a tow combiner positioned to receive at least a subset of the plurality of pre-consolidated tows from the feedstock source, and wherein the tow combiner is configured to combine the subset of the plurality of pre-consolidated tows to define a macro tow, wherein the tow combiner is configured to selectively and actively alter a shape of a cross-sectional profile of the macro tow along a length of the macro tow as the subset of the plurality of pre-consolidated tows is being combined to create the macro tow; and
   a feed mechanism configured to selectively start and stop movement of a selection of the plurality of pre-consolidated tows from the feedstock source and into the tow combiner to actively alter the shape of the cross-sectional profile of the macro tow along the length of the macro tow as the macro tow is being created, and wherein the feed mechanism is further configured to move the macro tow from the tow combiner.

2. The system of claim 1, wherein the non-liquid binding matrix is self-adherent, such that when the pre-consolidated tows are combined by the tow combiner, the subset of the plurality of pre-consolidated tows adhere to each other together to define the macro tow.

3. The system of claim 1,
   wherein the feedstock source further comprises one or more elongate structures; and
   wherein the tow combiner is positioned to receive at least a subset of the one or more elongate structures, and wherein the tow combiner is further configured to combine the subset of the one or more elongate structures with the subset of the plurality of pre-consolidated tows to define the macro tow.

4. The system of claim 3, wherein the elongate structures are free of a binding matrix.

5. The system of claim 1, further comprising:
   a plurality of pre-consolidated tow conduits through which the subset of the plurality of pre-consolidated tows respectively extend between the feedstock source and the tow combiner.

6. The system of claim 1, wherein the tow combiner comprises a plurality of inlets with each inlet of at least a first subset of the plurality of inlets configured to receive an individual pre-consolidated tow of the subset of the plurality of pre-consolidated tows.

7. The system of claim 6, wherein the tow combiner further comprises a plurality of outlets corresponding to the plurality of inlets.

8. The system of claim 6, wherein the tow combiner further comprises a single outlet, and wherein the inlets of the plurality of inlets converge to the single outlet for dispensing the macro tow from the tow combiner.

9. The system of claim 6, wherein the inlets of the plurality of inlets are arranged in an array configured to selectively define a plurality of shapes corresponding to cross-sectional profiles of the macro tow.

10. The system of claim 9, wherein the array is a rectangular array.

11. The system of claim 9, wherein the array is a hexagonal array.

12. The system of claim 1, wherein the feed mechanism is configured to engage the macro tow to move the subset of the plurality of pre-consolidated tows and the macro tow relative to the tow combiner.

13. The system of claim 1, wherein the feed mechanism is configured to engage the subset of the plurality of pre-consolidated tows to move the subset of the plurality of pre-consolidated tows and the macro tow relative to the tow combiner.

14. The system of claim 13, wherein the feed mechanism is configured to selectively move individual pre-consolidated tows of the subset of the plurality of pre-consolidated tows at different rates to actively define curvatures in the macro tow as the macro tow is being defined.

15. The system of claim 1, further comprising:
   a delivery guide positioned to receive the macro tow from the tow combiner and dispense the macro tow, wherein the delivery guide is configured to rotate relative to the tow combiner to twist the macro tow.

16. The system of claim 1, further comprising:
   a delivery guide positioned to receive the macro tow from the tow combiner and dispense the macro tow; and
   a drive assembly operatively coupled to the delivery guide and configured to selectively move the delivery guide in three dimensions to additively manufacture the composite part.

17. The system of claim 1, further comprising:
   an adhesive source configured to deliver an adhesive to the subset of the plurality of pre-consolidated tows or to the macro tow to adhere the subset of the plurality of pre-consolidated tows together to further define the macro tow or to adhere together spaced-apart portions of the macro tow as the composite part is being manufactured.

18. A system for additively manufacturing a composite part, the system comprising:
   a feedstock source comprising a plurality of pre-consolidated tows, wherein each pre-consolidated tow comprises a fiber tow within a non-liquid binding matrix;
   a tow combiner positioned to receive at least a subset of the plurality of pre-consolidated tows from the feedstock source, wherein the tow combiner is configured to combine the subset of the plurality of pre-consolidated tows to define a macro tow, wherein the tow combiner comprises a plurality of inlets with each inlet of at least a first subset of the plurality of inlets configured to receive an individual pre-consolidated tow of the subset of the plurality of pre-consolidated tows, and wherein the tow combiner further comprises a plurality of outlets corresponding to the plurality of inlets; and
   a feed mechanism configured to selectively start and stop movement of a selection of the plurality of pre-consolidated tows from the feedstock source and into the tow combiner to actively alter the shape of a cross-sectional profile of the macro tow along a length of the macro tow as the macro tow is being created, and wherein the feed mechanism is further configured to move the macro tow from the tow combiner.

19. The system of claim 18, wherein the feed mechanism is configured to engage the subset of the plurality of pre-consolidated tows to move the subset of the plurality of pre-consolidated tows and the macro tow relative to the tow combiner.

20. The system of claim 18, further comprising:
a delivery guide positioned to receive the macro tow from the tow combiner and dispense the macro tow; and
a drive assembly operatively coupled to the delivery guide and configured to selectively move the delivery guide in three dimensions to additively manufacture the composite part.

21. The system of claim 6, wherein the feed mechanism is configured to selectively start and stop movement of the selection of the plurality pre-consolidated tows through at least a subset of the plurality of inlets to actively alter the shape of the cross-sectional profile of the macro tow along the length of the macro tow as the macro tow is being created.

* * * * *